(12) United States Patent
Kurita et al.

(10) Patent No.: US 8,411,416 B2
(45) Date of Patent: Apr. 2, 2013

(54) SURFACE MOUNT ELECTRONIC COMPONENT AND METHOD FOR MANUFACTURING THE SAME

(75) Inventors: Junichi Kurita, Osaka (JP); Kenji Kuranuki, Kyoto (JP); Yuji Konda, Hyogo (JP); Yukihiro Shimasaki, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/058,065

(22) PCT Filed: Jun. 17, 2010

(86) PCT No.: PCT/JP2010/004028
§ 371 (c)(1),
(2), (4) Date: Feb. 8, 2011

(87) PCT Pub. No.: WO2010/150491
PCT Pub. Date: Dec. 29, 2010

(65) Prior Publication Data
US 2012/0087062 A1    Apr. 12, 2012

(30) Foreign Application Priority Data
Jun. 22, 2009 (JP) .................. 2009-147416

(51) Int. Cl.
*H01G 2/10* (2006.01)
*H01G 9/08* (2006.01)
(52) U.S. Cl. ...................... 361/535; 29/25.03
(58) Field of Classification Search .......... 361/523–525, 361/539, 535; 29/25.03
See application file for complete search history.

(56) References Cited

U.S. PATENT DOCUMENTS

| | | | |
|---|---|---|---|
| 2003/0081374 A1 | 5/2003 | Takada | |
| 2006/0152883 A1 | 7/2006 | Konuma | |
| 2007/0002525 A1* | 1/2007 | Yamanoi et al. | 361/508 |
| 2009/0237865 A1* | 9/2009 | Komazawa et al. | 361/528 |
| 2010/0091425 A1 | 4/2010 | Takeoka et al. | |
| 2010/0165547 A1 | 7/2010 | Kuranuki et al. | |

FOREIGN PATENT DOCUMENTS

| | | |
|---|---|---|
| CN | 1412797 A | 4/2003 |
| CN | 1714417 A | 12/2005 |
| CN | 101329950 A | 12/2008 |
| JP | 10-144573 A | 5/1998 |
| JP | 2001-126944 A | 5/2001 |
| JP | 2001278961 A * | 10/2001 |
| JP | 2003-289023 A | 10/2003 |
| JP | 2008159723 A * | 7/2008 |

(Continued)

OTHER PUBLICATIONS

International Search Report for Application No. PCT/JP2010/004028, Sep. 14, 2010, Panasonic Corporation.

*Primary Examiner* — Eric Thomas
(74) *Attorney, Agent, or Firm* — RatnerPrestia

(57) ABSTRACT

A surface mount electronic component includes an element, an anode terminal, a cathode terminal, and an outer package body. The element has a configuration including an anode, and a cathode formed on a part of the surface of the anode via a dielectric substance. An anode terminal is electrically connected to the anode, and a cathode terminal is electrically connected to the cathode. The outer package body covers an element laminated body such that a part of the anode terminal and a part of the cathode terminal are exposed. The outer package body is made of a norbornene resin. Thus, an electronic component having high reliability can be achieved.

14 Claims, 7 Drawing Sheets

| FOREIGN PATENT DOCUMENTS | | |
|---|---|---|
| JP | 2008-288295 A | 11/2008 |
| JP | 2008-288295 A | 11/2008 |
| JP | 2009-094474 A | 4/2009 |
| WO | WO 01/74924 A2 | 10/2001 |
| WO | WO 2007052652 A1 * | 5/2007 |
| WO | WO 2008/078491 A1 | 7/2008 |

* cited by examiner

SURFACE MOUNT ELECTRONIC COMPONENT AND METHOD FOR MANUFACTURING THE SAME

This application is a U.S. National Phase Application of PCT International Application PCT/JP2010/004028.

TECHNICAL FIELD

The present invention relates to a surface mount electronic component such as a solid electrolytic capacitor and a filter, in which a component element is covered with an outer package body made of resin, and a method for manufacturing the same.

BACKGROUND ART

A conventional surface mount electronic component such as a solid electrolytic capacitor and a filter includes an element, an anode terminal, a cathode terminal, and an outer package body. The element includes an anode and a cathode formed on a part of the surface of the anode via a dielectric substance. The anode terminal is electrically connected to the anode of the element. The cathode terminal is electrically connected to the cathode of the element. The outer package body covers the element such that a part of the anode terminal and a part of the cathode terminal are exposed. For the outer package body, an epoxy resin is generally used.

Such a surface mount electronic component is molded by disposing an element in a mold having a cavity, and infusing an epoxy resin into voids in the cavity.

As examples related to such an electronic component, the following Patent Literatures 1 and 2 are known.

However, a conventional surface mount electronic component has a problem that defects occur frequently because the viscosity of resin used for an outer package body is high. That is to say, in a molding process for infusing resin into a mold after an element is set in the mold, a load is applied to the element. In particular, the load is easily concentrated on an anode protruding from the element because the protruding anode is thin. Accordingly, the protruding anode bends and a cathode layer on the anode peels off, or cracks occur in the dielectric layer on the anode, which may increase leakage current and cause defects.

CITATION LIST

[Patent Literature 1] Japanese Patent Application Unexamined Publication No. 2009-94474
[Patent Literature 2] Japanese Patent Application Unexamined Publication No. 2003-289023

SUMMARY OF THE INVENTION

An electronic component of the present invention includes an element, an anode terminal, a cathode terminal, and an outer package body. The element includes an anode, and a cathode formed on a part of the surface of the anode via a dielectric substance. The anode terminal is electrically connected to the anode, and the cathode terminal is electrically connected to the cathode. The outer package body covers the element such that a part of the anode terminal and a part the cathode terminal are exposed. Furthermore, the outer package body is made of a norbornene resin.

A method for manufacturing an electronic component of the present invention includes: fixing an element between an upper mold and a lower mold; infusing a norbornene resin between the upper mold and the lower mold; carrying out polymerization at a constant temperature; and then carrying out post-curing.

When a norbornene resin having a low viscosity is used for the outer package body, a load is not easily applied to the element in a molding process for infusing resin into a mold. Therefore, it is possible to reduce bending of the anode or peeling of the cathode layer, or to reduce occurrence of cracks in the dielectric layer on the mold. Thus, occurrence of defects can be reduced.

DETAILED DESCRIPTION OF PREFERRED EMBODIMENTS (Exemplary Embodiment)

Figure 1:
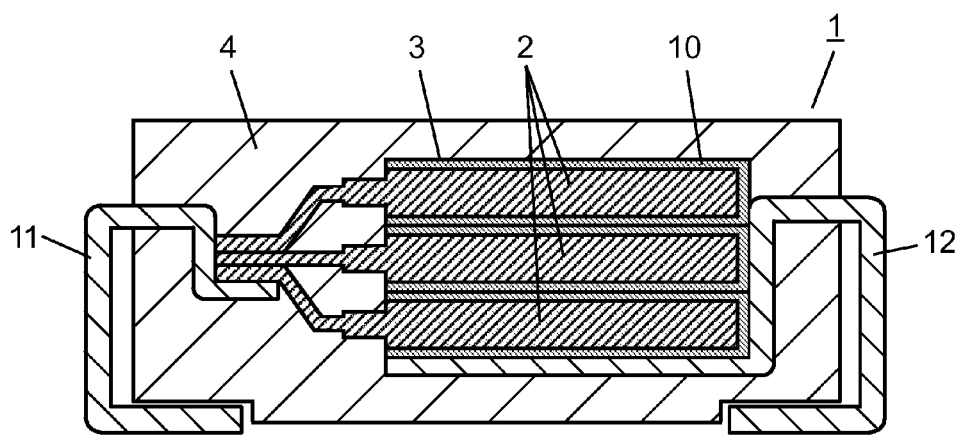
FIG. 1 is a sectional view showing a solid electrolytic capacitor in accordance with an exemplary embodiment of the present invention.

In this exemplary embodiment, firstly, a solid electrolytic capacitor is described as an example of a surface mount electronic component. FIG. 1 is a sectional view showing a solid electrolytic capacitor in accordance with an exemplary embodiment of the present invention.

First of all, a structure of solid electrolytic capacitor 1 of this exemplary embodiment is described. Solid electrolytic capacitor 1 includes capacitor laminated body 3 (element laminated body) configured as a single element by laminating a plurality of capacitor elements 2, and insulating outer package body 4 covering capacitor laminated body 3.

Figure 2:
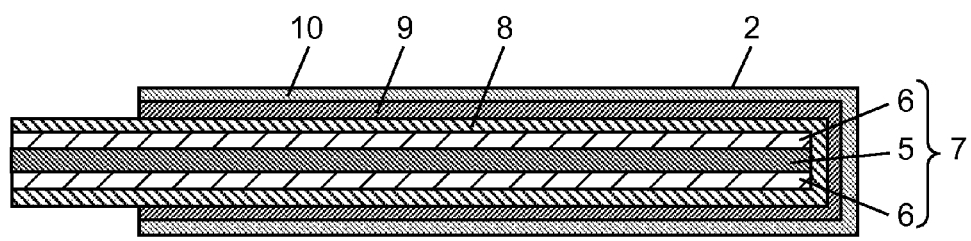
FIG. 2 is a sectional concept view showing a capacitor element of the solid electrolytic capacitor shown in FIG. 1.

FIG. 2 is a sectional concept view showing capacitor element 2 of solid electrolytic capacitor 1 shown in FIG. 1. As shown in FIG. 2, each capacitor element 2 includes valve metal porous layer 7 having foil-shaped core portion 5 and porous layers 6 formed on the upper and lower surfaces of core portion 5. Furthermore, capacitor element 2 includes dielectric layer 8 formed on the surface of valve metal porous layer 7, solid electrolyte layer 9 formed on dielectric layer 8, and cathode layer 10 formed on solid electrolyte layer 9.

Valve metal porous layer 7 works as an anode of capacitor element 2, and solid electrolyte layer 9 and cathode layer 10 work as a cathode of capacitor element 2.

In this exemplary embodiment, a plurality of capacitor elements 2 are all disposed in the same direction in such a manner that anodes of capacitor elements 2 are piled up. However, the plurality of capacitor elements 2 may be disposed alternately in the opposite direction to each other, or a part of capacitor elements 2 may be disposed in an opposite direction to other capacitor elements 2. In this case, the anodes are disposed on both ends of capacitor laminated body 3, and the cathodes are disposed in the center.

Then, each valve metal porous layer 7 (anode) of capacitor element 2 is connected to anode terminal 11, and a part of anode terminal 11 is extracted to the outside of outer package body 4 and exposed to the surface. In this exemplary embodiment, porous layer 6 is connected to anode terminal 11, but core portion 5 may be exposed and connected to anode terminal 11.

Furthermore, cathode layer 10 is connected to cathode terminal 12, and a part of cathode terminal 12 is extracted to the outside of outer package body 4 and exposed to the surface. In FIG. 2, a cathode (solid electrolyte layer 9 and cathode layer 10) is formed on a part of the surface of valve metal porous layer 7 as an anode via dielectric layer 8. A region in which a cathode of capacitor element 2 is formed is thicker than valve metal porous layer 7 (anode) on which the cathode is not formed. Therefore, space is generated between anodes before resin is filled. Therefore, in at least a part of the plurality of capacitor elements 2, valve metal porous layers 7 (anodes) are laminated on the other valve metal porous layer 7 (anode) in a state in which they are bent so as to adjust the height, and then connected to anode terminal 11. In FIG. 1, valve metal porous layer 7 is bent in the middle of the portion in which the cathode is not formed, but may be bent at a boundary between valve metal porous layer 7 and the cathode. Furthermore, valve metal porous layer 7 may be curved gently.

Next, a material of solid electrolytic capacitor 1 of this exemplary embodiment is described. In this exemplary embodiment, aluminum is used for foil-shaped core portion 5 and porous layer 6. In this exemplary embodiment, the thickness of core portion 5 is 20 μm or more and 80 μm or less, and the thickness of one side of the porous layer is 10 μm or more and 80 μm or less. As materials other than aluminum for valve metal porous layer 7, a porous sintered body made of valve action metal foil or valve action metal powder of tantalum, niobium, titanium, and the like, may be used. For example, when a porous sintered body made of tantalum is used for valve metal porous layer 7, core portion 5 may be formed of foil-shaped, or plate-shaped, or line-shaped tantalum. Furthermore, porous layer 6 in this exemplary embodiment is formed by etching the surface of aluminum foil in this exemplary embodiment. However, particles of a valve metal such as aluminum may be formed on the surface of aluminum foil by vapor deposition.

In any cases, it is preferable that porous layer 6 has a large number of holes, and the porosity is 50% or more and 80% or less. Furthermore, it is preferable that the mode of the hole diameter (diameter) is 0.01 μm or more and 0.30 μm or less. The mode of the hole diameter refers to a peak value of distribution of hole diameters measured by a mercury intrusion method. With such porosity and hole diameter, a surface area of valve metal porous layer 7 can be increased and the capacity of a solid electrolytic capacitor can be increased.

In this exemplary embodiment, dielectric layer 8 is formed of aluminum oxide by anodic-oxidizing the surface of porous layer 6. Furthermore, solid electrolyte layer 9 is formed by using polypyrrole, but it may be formed of a conductive polymer such as polythiophene and polyaniline, a semiconductor material such as manganese dioxide, and the like. Then, in this exemplary embodiment, cathode layer 10 is formed of a carbon layer and a silver paste layer coated on the carbon layer.

Furthermore, in outer package body 4, a norbornene resin is used. The norbornene resin is formed by polymerizing and hardening a norbornene monomer. In this exemplary embodiment, the norbornene monomer includes dicyclopentadiene having a norbornene-ring structure as a main component. The norbornene monomer as the material may include accessory components such as cyclopentadiene and tricyclopentadiene in addition to dicyclopentadiene.

In this exemplary embodiment, in hardened outer package body 4, the weight ratio of the norbornene monomer such as dicyclopentadiene, cyclopentadiene, and tricyclopentadiene is preferably 10000 ppm by weight or less and more preferably 5000 ppm by weight or less in total.

In this exemplary embodiment, this norbornene resin includes 65% by weight or more and 95% by weight or less of inorganic filler made of aluminum hydroxide. As the inorganic filler, highly incombustible filler is preferable, and aluminum hydroxide, magnesium hydroxide, silica, or the mixture thereof may be used. When the content of the inorganic filler is made to be 65% by weight or more, it is possible to enhance the incombustibility, enhance the bend elastic constant and the bending strength after hardening, suppress deformation of the electronic component, and enhance the mechanical strength. Furthermore, in this exemplary embodiment, the content of the inorganic filler is made to be 95% by weight or less so as to maintain the fluidity suitable for molding.

Figure 3:
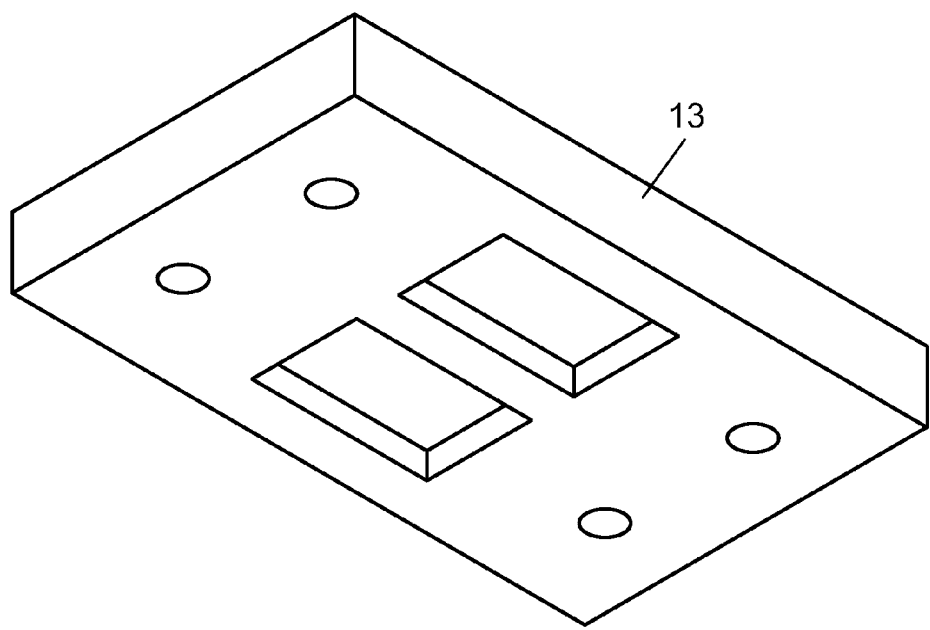
FIG. 3 is a perspective view showing an upper mold used in molding the solid electrolytic capacitor shown in FIG. 1.
Figure 4:
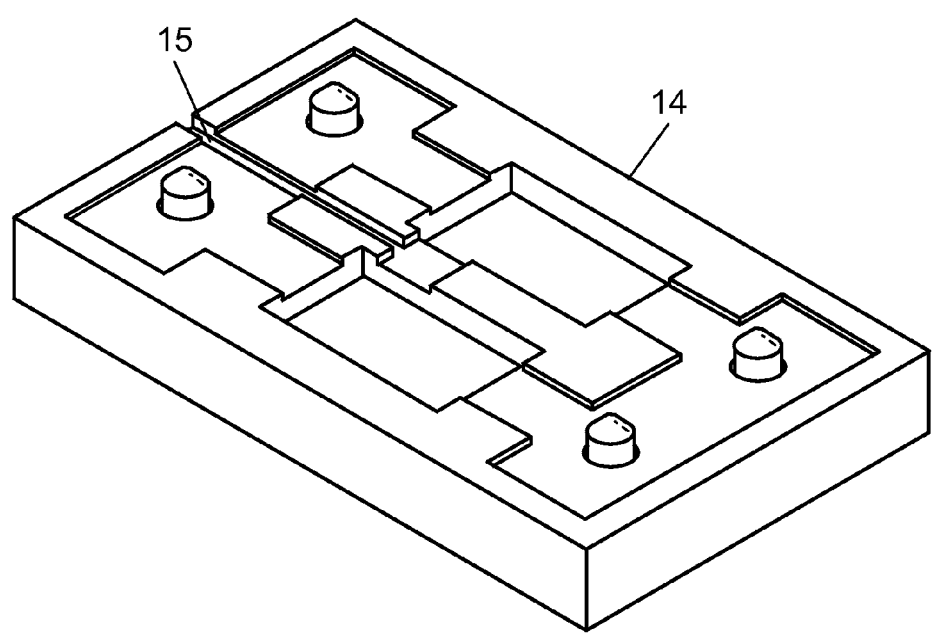
FIG. 4 is a perspective view showing a lower mold used in molding the solid electrolytic capacitor shown in FIG. 1.
Figure 5:
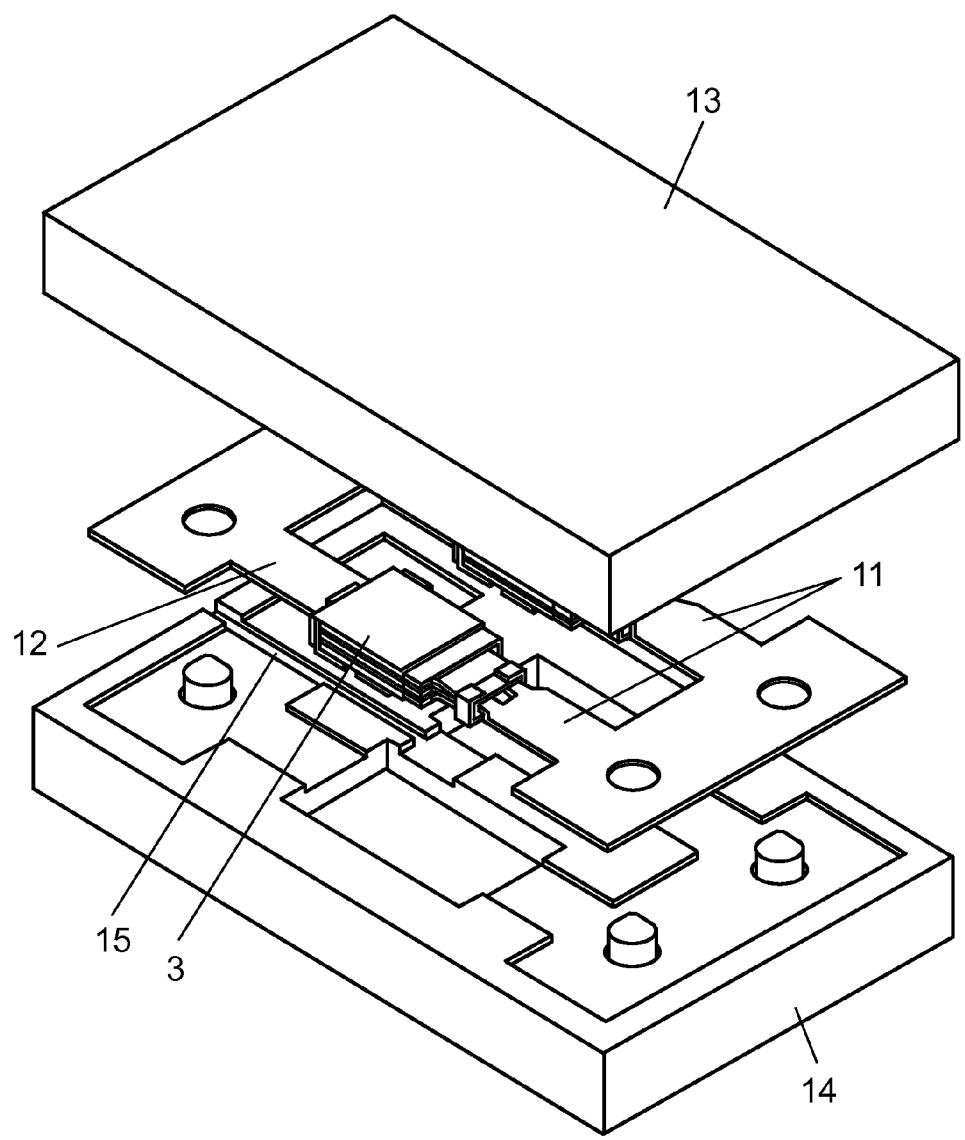
FIG. 5 is a perspective view showing a midway of manufacturing a solid electrolytic capacitor in accordance with an exemplary embodiment of the present invention.
Figure 6:
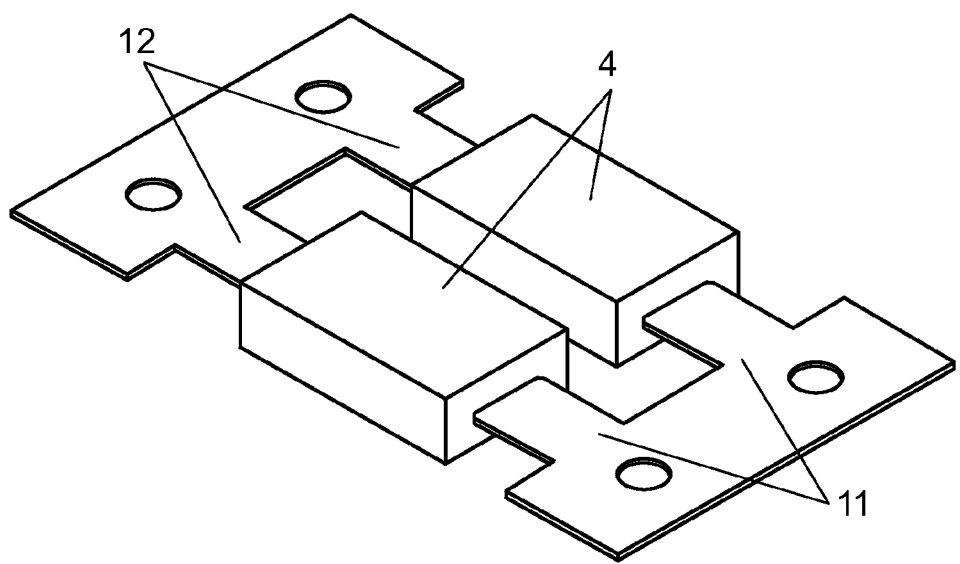
FIG. 6 is a perspective view showing the solid electrolytic capacitor shown in FIG. 1 and an external connection terminal.

Next, a method for covering capacitor laminated body 3 with outer package body 4 in accordance with this exemplary embodiment is described below. FIG. 3 is a perspective view showing an upper mold used for molding the solid electrolytic capacitor shown in FIG. 1. FIG. 4 is a perspective view showing a lower mold used for molding a solid electrolytic capacitor shown in FIG. 1. FIG. 5 is a perspective view showing a process for manufacturing a solid electrolytic capacitor in accordance with an exemplary embodiment of the present invention. FIG. 6 is a perspective view showing the solid electrolytic capacitor shown in FIG. 1 and external connection terminals.

Firstly, as shown in FIG. 5, capacitor laminated body 3 is fixed between upper mold 13 shown in FIG. 3 and lower mold 14 shown in FIG. 4. At this time, it is preferable that the temperature of upper mold 13 and lower mold 14 is set to 60° C. or more and 100° C. or less. This makes it possible to promote a polymerization reaction and to harden a norbornene monomer uniformly and at a high speed.

Then, after upper mold 13 and lower mold 14 are mold-clamped, resin solution is infused into the inside of upper mold 13 and lower mold 14 through gate hole 15. The resin solution is infused so as to cover the entire capacitor laminated body 3 except for anode terminal 11 and cathode terminal 12. Note here that the injection pressure of the resin solution is made to be 0.2 MPa.

This resin solution is a mixture solution formed by mixing two solutions: a solution including a norbornene monomer containing dicyclopentadiene as a main component and inorganic filler; and a solution including a catalyst, its solvent and an antioxidant. Note here that the catalyst is made to be 1/100 or less and 1/200 or more in the molar concentration ratio with respect to the norbornene monomer of dicyclopentadiene and the like.

This mixed solution may further include filler for coloring and a compound for adjusting the viscosity. In this mixed solution, the content or particle diameter of the inorganic filler is adjusted so that the viscosity at 10° C. or more and 40° C. or less is 200 mPa·s or more and 1200 mPa·s or less. When the viscosity is adjusted to the above-mentioned range, the fluidity that is extremely suitable for molding can be achieved.

Furthermore, it is preferable to use spherical filler and crushed filler as the inorganic filler. The spherical filler and the crushed filler are suitable for filler for an outer package resin of an electronic component, but they need to secure dispersibility. In order to do so, kneading and dispersing are carried out by using a planetary mixer, and the like.

Inorganic filler having a particle diameter of 55 μm or less may be used or relatively rough filler having a particle diameter of 150 μm or less may be used. In any cases, the content or shape of the filler may be adjusted so that the viscosity of the mixed solution of the norbornene resin is 200 mPa·s or more and 1200 mPa·s or less at 10° C. or more and 40° C. or less.

As mentioned above, in this exemplary embodiment, the surrounding of capacitor laminated body 3 is covered with a norbornene resin. The polymerization time of a norbornene monomer is set to 10 seconds after infusion of the monomer at 60° C. or more and 100° C. or less although it may be dependent upon the added amount of a catalyst. The infusion speed of the monomer at this time is set to 2 cc/s or more and 5 cc/s or less.

The above-mentioned polymerization time is extremely shorter as compared with a polymerization time of liquid epoxy resin conventionally used in an outer package body, which is several minutes to several hours at shortest. Therefore, in this exemplary embodiment, the productivity of products can be improved.

When outer package body 4 hardened by polymerization is formed, and capacitor laminated body 3 is taken out from the mold, a state as shown in FIG. 6 is obtained. Capacitor laminated body 3 formed by integrating anode terminal 11, cathode terminal 12 and outer package body 4 is subjected to post-curing at 90° C. or 120° C. for one hour in a high-temperature reactor.

In this exemplary embodiment, it is possible to reduce the remaining amount of the norbornene monomer in the aforementioned polymerization temperature range and the above-mentioned post-curing temperature.

Figure 7:
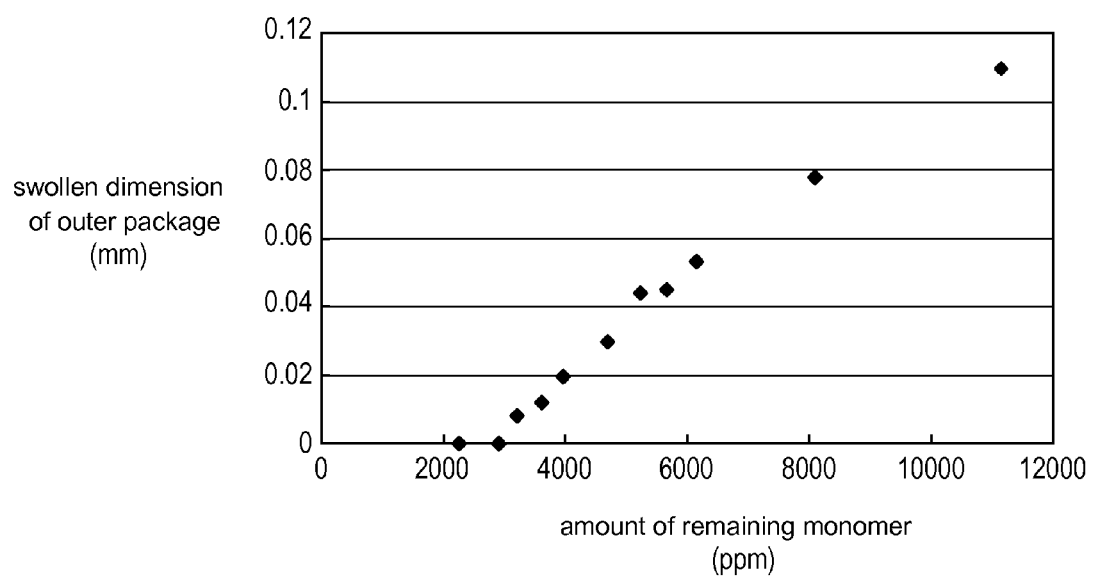
FIG. 7 is a graph showing a relation between an amount of remaining monomer and a swollen dimension of an outer package.

Table 1 shows a relation of a mold temperature and a post-curing temperature of the solid electrolytic capacitor with respect to an amount of remaining monomer and a swollen dimension of an outer package. FIG. 7 is a graph showing a relation between the amount of remaining monomer and the swollen dimension of the outer package shown in Table 1.

Note here that the product height of the solid electrolytic capacitor of the exemplary embodiment is 1.9 mm, and the standard product height is within 1.9 mm±0.1 mm. Thus, when the swelling of outer package body 4 is more than 0.1 mm, the determination in Table 1 is defined as "x." When the swelling is 0.03 mm or less, the determination is defined as "o" because extremely high reliability is achieved even if heat is added in the soldering reflow process. When the swelling is more than 0.03 mm and 0.1 mm or less, the determination is defined as "Δ."

In this exemplary embodiment, as to the swollen dimension of the outer package, when the amount of remaining monomer is more than 10000 ppm by weight, the swollen dimension of the outer package is more than 0.1 mm, showing that outer package body 4 is largely swollen.

Furthermore, when the amount of remaining monomer is more than 5000 ppm by weight and 10000 ppm by weight or less, the swollen dimension of outer package body 4 is more than 0.03 mm but it is 0.1 mm or less. Thus, the swelling of outer package body 4 can be reduced. Furthermore, when the amount of remaining monomer is 5000 ppm by weight or less, the swollen dimension of outer package body 4 is 0.03 mm or less, and thus the swelling of outer package body 4 can be mostly suppressed.

Hereinafter, the effect of this exemplary embodiment is described. In this exemplary embodiment, the swelling of outer package body 4 of solid electrolytic capacitor 1 can be suppressed, thus enabling the reliability to be enhanced.

In this exemplary embodiment, in order to suppress the swelling of outer package body 4 in this way, it is found to be effective to suppress the amount of monomer remaining in outer package body 4 after polymerization to 10000 ppm by weight or less, and to suppress the generation of gas from outer package body 4.

That is to say, when the amount of remaining monomer is suppressed as mentioned above, when solid electrolytic capacitor 1 is mounted, even if heat is applied during a solder reflow process, gasification of monomer can be suppressed and the swelling of a product can be suppressed. As a result, it is possible to obtain highly reliable solid electrolytic capacitor 1 which does not exceed the product standard size or in which a solder is not easily detached.

Herein, when the inorganic filler is filled at a high density (65% by weight or more and 95% by weight or less), the problem that gas is generated from outer package body 4 during soldering becomes more remarkable.

This is thought to be because when the content of inorganic filler is increased, polymerization becomes non-contiguous at

TABLE 1

| | Conditions | | | | | | | | |
|---|---|---|---|---|---|---|---|---|---|
| | Without post-cure | | | Post-cure at 90° C. | | | Post-cure at 120° C. | | |
| Mold temperature | Amount of remaining monomer (ppm) | Swollen dimension of outer package (mm) | D | Amount of remaining monomer (ppm) | Swollen dimension of outer package (mm) | D | Amount of remaining monomer (ppm) | Swollen dimension of outer package (mm) | D |
| 60° C. | 11124 | 0.11 | x | 5647 | 0.044 | Δ | 3911 | 0.02 | o |
| 80° C. | 8068 | 0.078 | Δ | 4666 | 0.03 | o | 3180 | 0.008 | o |
| 90° C. | 6147 | 0.053 | Δ | 3937 | 0.02 | o | 2880 | 0 | o |
| 100° C. | 5206 | 0.043 | Δ | 3584 | 0.012 | o | 2248 | 0 | o |

D: Determination
o: good, Δ: good to some extent, x: not good the interface between the inorganic filler and the norbornene monomer, and thus the amount of remaining monomer is increased.

In this exemplary embodiment, the heat temperature of upper mold 13 and lower mold 14, polymerization temperature, polymerization time, post-curing conditions, and the like, are made to be the above-mentioned configurations, and the remaining amount of the norbornene monomer is suppressed to 10000 ppm by weight or less and more preferably 5000 ppm by weight or less. As a result, the generation of gas is reduced, and the reliability of the electronic component can be enhanced.

When the content of the inorganic filler is made to be 65% by weight or more, the bend elastic constant can be increased, deformation can be suppressed, and the reliability can be enhanced in solid electrolytic capacitor 1. Furthermore, it is possible to increase a bending strength, and maintain a mechanical strength of solid electrolytic capacitor 1.

Furthermore, in this exemplary embodiment, the post-curing temperature is made to be a constant temperature of 90° C. or 120° C., but the post-curing temperature may be increased in a plurality of stages. For example, post-curing may be carried out at 90° C. or more and 100° C. or less for one to three hours, and at 110° C. or more and 160° C. or less for one to three hours. Note here that when the polymerization temperature is relatively low such as about 60° C., post-curing firstly is carried out at 70° C. or more and 75° C. or less for one to three hours, and then at 90° C. or more and 140° C. or less.

In this way, the post-curing is carried out at a temperature of the polymerization temperature or higher and at the temperature increased from the polymerization temperature by 20° C. or less, and then the post-curing is further carried out at a high temperature increased from the temperature by 20° C. or more and 70° C. or less. Thereby, the entire electronic component can be heat-treated uniformly. As a result, the degree of polymerization can be enhanced and the remaining amount of the norbornene monomer can be reduced.

Furthermore, the norbornene resin used for outer package body 4 in this exemplary embodiment has a viscosity of 200 mPa·s or more and 1200 mPa·s or less, which is extremely lower as compared with a viscosity in a conventional liquid epoxy resin, that is, about 100 Pa·s. That is to say, in this exemplary embodiment, since a norbornene monomer having a low viscosity may be simply injection-molded, it is possible to easily cover small solid electrolytic capacitor 1 or solid electrolytic capacitor 1 having a complicated shape in which a plurality of capacitor elements 2 are laminated. Thus, a yield is increased.

Furthermore, since the resin solution has a low viscosity, a load is not easily applied to capacitor element 2 during the process of infusing a resin solution into upper mold 13 and lower mold 14. Therefore, it is possible to reduce bending of an anode thereby causing peeling off a cathode, or occurrence of cracks in the dielectric layer on the anode (valve metal porous layer 7). Thus, leakage current can be reduced.

In particular, since there is space between valve metal porous layers 7 as an anode, a resin solution easily enters therein, so that a load is easily applied. Furthermore, when each of valve metal porous layers 7 is bent or curved, a pressure from the resin solution is easily concentrated, thus causing cracks easily. When cracks occur in this way, the dielectric layer may be broken, and thus leakage current becomes larger. Therefore, as in this exemplary embodiment, it is useful to use a resin solution having a low viscosity for suppressing cracks in valve metal porous layer 7 and reducing leakage current.

Furthermore, porous layer 6 having a large number of voids and small hole is weak in mechanical strength and susceptible to a load, and therefore cracks easily occur. Therefore, it is useful to use a resin solution having a low viscosity as in this exemplary embodiment. Furthermore, also when only core portion 5 is exposed and connected to anode terminal 11, since the film thickness of only core portion 5 is small, it is useful to use a resin solution with a low viscosity as in this exemplary embodiment.

Furthermore, this exemplary embodiment shows a state in which a cathode is not formed on a part of valve metal porous layer 7, and the part protrudes from the cathode. Thus, since a region in which valve metal porous layer 7 protrudes has a thin film thickness, the region is susceptible to stress loading. Therefore, conventionally, due to stress from a resin solution, a valve metal porous layer may bend and a solid electrolyte layer of a cathode may peel off. Furthermore, cracks occur in the anode, so that dielectric layer 8 may be broken, thus causing current leakage. On the contrary, in this exemplary embodiment, since a resin solution with a low viscosity is used, a load of capacitor element 2 can be reduced, and occurrence of defects such as occurrence of leakage current and deformation of the element can be reduced.

In addition, even when 65% by weight or more of inorganic filler is contained, the viscosity before polymerization is made to be 1200 mPa·s or less at 10° C. or more and 40° C. or less. Thus, excellent moldability can be achieved. Even when a plurality of solid electrolytic capacitors 1 are molded at one time, variation in molding can be reduced. Furthermore, stress loaded to capacitor element 2 can be reduced, which contributes to the improvement of reliability of solid electrolytic capacitor 1.

Note here that the norbornene resin used in this exemplary embodiment is more resistant to moisture as compared with a thermosetting resin such as an epoxy resin, a polyester resin, or the like, and has a higher rigidity. Therefore, only by covering the surrounding of capacitor element 2 with outer package body 4 made of a norbornene resin, the moisture resistance, strength, and impact resistance can be secured, thus contributing to reliability and miniaturization of solid electrolytic capacitor 1.

Furthermore, since the norbornene resin has a high strength and the high impact resistance, outer package body 4 itself can be thinned. Therefore, small size and short height can be achieved, resulting in reduction of a material cost. Furthermore, with high rigidity and thin thickness of outer package body 4, reliability to vibration can be improved.

Figure 8:
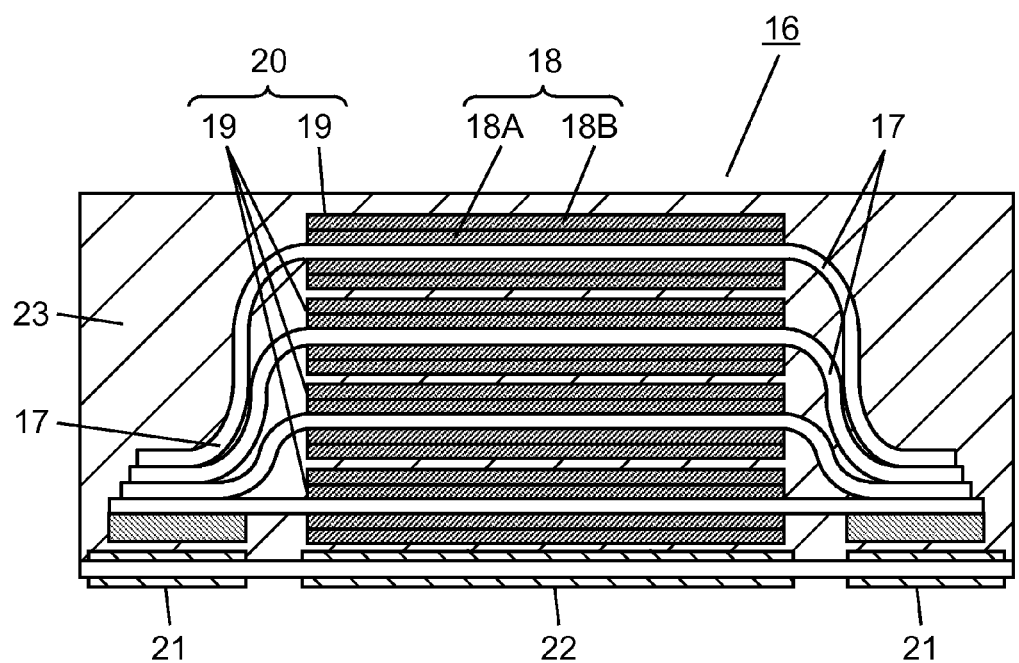
FIG. 8 is a sectional view showing a filter in accordance with an exemplary embodiment of the present invention.

The above-mentioned exemplary embodiment describes solid electrolytic capacitor 1 formed by laminating anodes of a plurality of capacitor elements as an example. However, as shown in FIG. 8, through type filter 16 provided with two anodes may be employed. FIG. 8 is a sectional view showing a filter in accordance with an exemplary embodiment of the present invention.

Filter 16 of FIG. 8 has a plurality of filter elements 19 each including anode 17 at both ends and cathode 18 between anodes 17 of both ends. These filter elements 19 are laminated such that anodes 17 of both ends and cathodes 18 are piled up so as to form filter laminated body 20 (element laminated body).

Similar to capacitor element 2, each filter element 19 has a valve metal porous layer including a core portion (not shown) and a porous layer (not shown) formed on the core portion. Each filter elements 19 further includes a dielectric layer (not shown) formed on the porous layer, solid electrolyte layer 18A formed on the dielectric layer, and cathode layer 18B formed on solid electrolyte layer 18A. The valve metal porous layer forms anode 17 of filter elements 19. When the porous layer is not provided, only the core portion forms anode 17. Furthermore, solid electrolyte layer 18A and cathode layer 18B form cathode 18 of filter element 19.

Then, anodes 17 at both ends are respectively bent or curved and electrically connected to anode terminal 21 provided on the lower surface of the filter. Cathode 18 is electrically connected to cathode terminal 22 in the center. Outer package body 23, which covers filter laminated body 20 such that a part of anode terminal 21 and a part of cathode terminal 22 are exposed, is made of a norbornene resin similar to solid electrolytic capacitor 1. Also in such filter 16, the same effects as in solid electrolytic capacitor 1, for example, reduction of defects including reduction of leakage current and improvement of productivity, can be exhibited.

Figure 9:
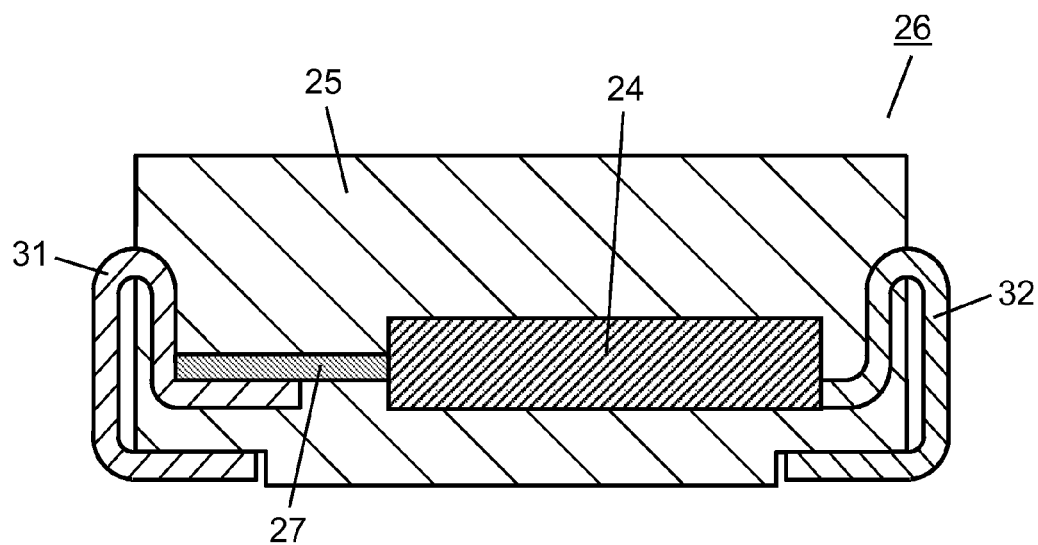
FIG. 9 is a sectional view showing a solid electrolytic capacitor in accordance with an exemplary embodiment of the present invention.
Figure 10:
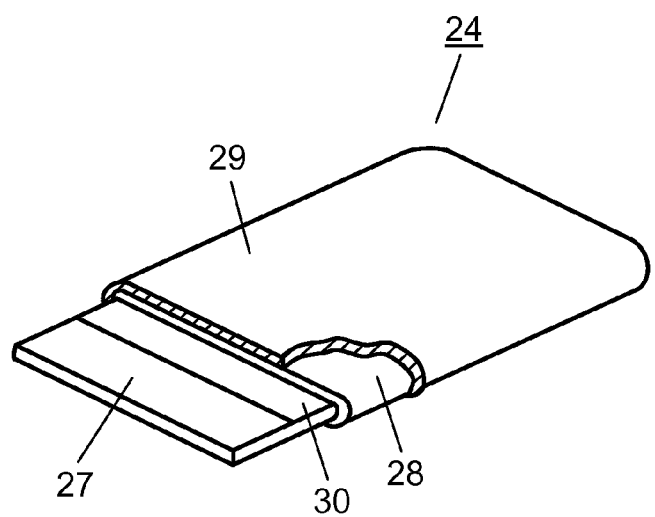
FIG. 10 is a partially cutaway perspective view showing a solid electrolytic capacitor in accordance with an exemplary embodiment of the present invention.

Furthermore, the above-mentioned exemplary embodiment describes an example of solid electrolytic capacitor 1 in which a plurality of capacitor elements 2 are laminated. However, examples include solid electrolytic capacitor 26 in which single-layered capacitor element 24 shown in FIG. 10 is covered with outer package body 25 as shown in FIG. 9. FIG. 9 is a sectional view showing a solid electrolytic capacitor in accordance with an exemplary embodiment of the present invention. FIG. 10 is a partially cutaway perspective view showing a solid electrolytic capacitor in accordance with an exemplary embodiment of the present invention.

As shown in FIG. 10, capacitor element 24 includes valve metal porous layer 27 having a foil-shaped, plate-shaped or line-shaped core portion (not shown) and a porous layer formed on at least one of the upper surface and the lower surface of the core portion, a dielectric layer (not shown) formed on the surface of valve metal porous layer 27, solid electrolyte layer 28 formed on the dielectric layer, and cathode layer 29 formed on solid electrolyte layer 28.

Valve metal porous layer 27 including the core portion and the porous layer forms an anode of capacitor element 24. Furthermore, solid electrolyte layer 28 and cathode layer 29 form a cathode of capacitor element 24.

The cathode may be formed so as to cover a part of the anode via the dielectric layer, and insulating portion 30 made of an insulating resin may be formed between a region in which the cathode is formed and a region in which an anode is exposed.

As shown in FIG. 9, the anode is connected to anode terminal 31, the cathode is connected to cathode terminal 32, and capacitor element 24 is covered with outer package body 25 such that a part of anode terminal 31 and a part of cathode terminal 32 are exposed. Outer package body 25 is also made of a norbornene resin.

Also in such capacitor element 24, the same effects as in solid electrolytic capacitor 1 in the above-mentioned exemplary embodiment, for example, reduction of defects including reduction of leakage current, improvement of the productivity, and the like, can be obtained.

Industrial Applicability

When an outer package body of the present invention is used, a surface mount electronic component having high reliability, such as a solid electrolytic capacitor and a filter, can be achieved.

The invention claimed is:

1. A surface mount electronic component, comprising:
   an element including:
      an anode;
      a cathode formed on a part of a surface of the anode via a dielectric substance;
      an anode terminal electrically connected to the anode;
      a cathode terminal electrically connected to the cathode; and
   an outer package body covering the element such that a part of the anode terminal and a part of the cathode terminal are exposed;
   wherein the outer package body is made of a norbornene resin containing an amount of norbornene monomers, the amount being greater than 0 ppm by weight and less than or equal to 10000 ppm by weight.

2. The surface mount electronic component of claim 1, wherein a plurality of the elements are laminated.

3. The surface mount electronic component of claim 2, wherein at least parts of the plurality of anodes are bent or curved, and laminated on another anode.

4. The surface mount electronic component of claim 1, wherein the outer package body is molded such that filler is included and 5000 ppm by weight or less of norbornene monomers are contained.

5. The surface mount electronic component of claim 1, wherein in the outer package body, 65% by weight or more and 95% by weight or less of filler is included.

6. The surface mount electronic component of claim 1, wherein the anode has a porous layer on a surface thereof, and a porosity of the porous layer is 50% or more and 80% or less.

7. The surface mount electronic component of claim 1, wherein the anode has a porous layer on a surface thereof, and a mode of a diameter of a hole of the porous layer is 0.01 μm or more and 0.30 μm or less.

8. The surface mount electronic component of claim 7, wherein a film thickness of the porous layer is 10 μm or more and 80 pm or less.

9. The surface mount electronic component of claim 6, wherein a film thickness of the porous layer is 10 μm or more and 80 μm or less.

10. The surface mount electronic component of claim 1, wherein the norbornene resin includes filler, and has a viscosity of 200 mPa·s or more and 1200 mPa·s or less before polymerization at 10° C. or more and 40° C. or less.

11. The surface mount electronic component of claim 1, wherein the norbornene resin is polymerized at a temperature of 60° C. or more and 100° C. or less, and then post-cured at a temperature of 90° C. or more and 160° C. or less.

12. The surface mount electronic component of claim 1, wherein the norbornene resin is post-cured at a temperature of a polymerization temperature or higher and at a temperature increased from the polymerization temperature by 20° C. or less, and then further post-cured at a temperature increased from the post-curing temperature by 20° C. or more and 70° C. or less.

13. A method for manufacturing a surface mount electronic component comprising an element including an anode and a cathode formed on a part of a surface of the anode via a dielectric substance, the method comprising:
   electrically connecting the anode to an anode terminal;
   electrically connecting the cathode to a cathode terminal;
   fixing the element between an upper mold and a lower mold;
   infusing a norbornene resin between the upper mold and the lower mold;
   polymerizing the norbornene resin at a temperature of 60° C. or more and 100° C. or less; and
   then post-curing the norbornene resin at 90° C. or more and 160° C. or less until the norbornene resin contains norbornene monomer in an amount greater than 0 ppm by weight and less than or equal to 10,000 ppm by weight.

14. A method for manufacturing a surface mount electronic component comprising an element including an anode and a cathode formed on a part of a surface of the anode via a dielectric substance, the method comprising:

electrically connecting the anode to an anode terminal;
electrically connecting the cathode to a cathode terminal;
fixing the element between an upper mold and a lower mold;
infusing a norbornene resin between the upper mold and the lower mold;
polymerizing the norbornene resin at a constant temperature;
carrying out post-curing at a polymerization temperature or higher and at a temperature increased from the polymerization temperature by 20° C. or less; and
then carrying out post-curing at a temperature increased from the post-curing temperature by 20° C. or more and 70° C. or less until the norbornene resin contains norbornene monomer in an amount greater than 0 ppm by weight and less than or equal to 10,000 ppm by weight.

* * * * *